United States Patent
Piercy et al.

(10) Patent No.: US 6,388,564 B1
(45) Date of Patent: May 14, 2002

(54) POWER DISTRIBUTION GRID COMMUNICATION SYSTEM

(75) Inventors: Raymond Piercy; John Kuurstra; Andrew Cullen, all of Toronto (CA)

(73) Assignee: Digital Security Controls Ltd., Concord ( * ) Notice: Subject to any disclaimer, the term of this patent is extended or adjusted under 35 U.S.C. 154(b) by 0 days.

(21) Appl. No.: 09/740,796

(22) Filed: Dec. 21, 2000

Related U.S. Application Data

(62) Division of application No. 09/085,446, filed on May 28, 1998, now Pat. No. 6,157,292.

(30) Foreign Application Priority Data

Dec. 4, 1997 (CA) .............................................. 2223666

(51) Int. Cl.[7] .............................................. H04M 11/04
(52) U.S. Cl. ............. 340/310.01; 340/506; 340/825.06; 340/825.36
(58) Field of Search ....................... 340/310.01, 310.06, 340/538, 3.71, 825.36, 825.06, 506; 700/17; 708/139

(56) References Cited

U.S. PATENT DOCUMENTS 5,400,246 A * 3/1995 Wilson et al. ...... 340/835.06 X

* cited by examiner

Primary Examiner—Daryl Pope

(57) ABSTRACT

A communication system arrangement uses powerline distribution systems to broadcast a signal from the distribution station to individual households. The signal is coded, using a spread spectrum technique and the receiving arrangement is designed to process the signal quickly for transmission to downstream households. In a preferred embodiment equipment, within each household is able to initiate a communication to a predetermined computer for reporting in accordance with an instruction signal received over the powerline system. With this system, a narrow band broadcast signal arrangement is realized, which does not require extensive modification to the distribution system.

7 Claims, 5 Drawing Sheets

POWER DISTRIBUTION GRID COMMUNICATION SYSTEM

RELATED APPLICATIONS

This application is a Divisional of U.S. application Ser. No 09/085,446 filed May 28, 1998, now U.S. Pat. No. 6,157,292.

FIELD OF THE INVENTION

The present invention relates to transmission of communication signals over a power transmission grid from at least a power distribution station to individual households and to a system which uses the received communication for control of electrical appliances and user viewing of other information. The system optionally includes an outbound communication channel from the household to a predetermined computer over a different channel such as a telephone channel, cable channel or RF link. This outbound channel allows a report signal to be sent and the report is carried out by a device in the household using this different channel.

BACKGROUND OF THE INVENTION

Electrical power systems have long been recognized as having the potential to be used as an effective communication channel but in practice, this potential is severely restricted due to the strong power signal being transmitted and the harmonics of the power signal, as well as the frequency characteristics of local power distribution equipment. To overcome this problem, some powerline carrier line systems have used a high frequency communication signal which is not affected by the power signal. Unfortunately, such high frequency signals encounter problems where the power distribution system includes power factor correction capacitor banks. In order for the high frequency signal to be transmitted, these capacitor banks have to be trapped. Unfortunately, it is difficult and expensive to carry this out and it is even more difficult to ensure that this always occurs. Failure to take this corrective step results in the loss of the communication signal. The high cost and the difficulty of controlling this arrangement renders a high frequency transmitter system ineffective. The potential of powerline transmission systems being used as a communication channel continues to be attractive, however, the effective use of this potential communication path has proven difficult to realize.

Powerline carrier systems (PLC) can be divided into two segments, a powerline transmission segment and a downstream powerline distribution network segment.

PLC systems applied to distribution networks have a group of special technical obstacles that are not experienced in transmission level PLC. Distribution line carrier (DLC) signals must propagate through networks that are extremely hard to model as the networks branch and mesh with each other while experiencing highly variable levels of loading. DLC signals must traverse a network that was designed to carry power signals at 50/60 Hz and are optimized for this task. Power transformers at PLC frequencies are modelled primarily, at PLC frequencies, by their leakage reactance and tend to block DLC signals. Capacitor banks used for power factor correction present a low-impedance path to ground and sink DLC signals unless they are trapped out with reactors.

Finally, standing-wave phenomena cause many nodal points to occur throughout the distribution network when carrier frequencies become greater than 5 kHz. To obviate this problem, many carrier frequencies can be employed simultaneously but at the cost of increased receiver complexity.

These obstacles lead to the development of so-called ripple control system in the 1960s for use with residential and commercial load shedding systems that helped utilities offset peak demand and maintain service during periods of generation shortfall. Traditional residential load-shedding systems controlled appliances by transmitting signals having very low information content and low bandwidths. Ripple control systems relied on binary on/off signalling, or amplitude shift keying (ASK), at typical signalling rates of between 0.5 and 5 baud. Messages were sent as broadcast "telegrams" to residential loads to either turn on or off consumption, typically with a safety time-out mechanism in case the load failed to receive a turn on signal after a load shed request. This was necessary as signals were commonly not received or not recognized. Carrier frequencies of ripple systems were kept very low, between 30–1000 Hz, in order to avoid the cost of distribution network changes but placed the signals in the most noisy area of the powerline spectrum. The magnitude of power frequency harmonics can be very large, with respect to the fundamental, below 2.5 kHz and jam any communication systems that use this frequency range to transmit.

Ripple systems with their low signal rates require only about 10 Hz of bandwidth to communicate and could easily fit between two 50/60 Hz harmonics. The problem during the 1960s and 1970s was that the narrow band filters used to isolate the ripple signal from the noise usually let in more power frequency harmonics than they did signal. The solution for many utilities, even today, is to drastically increase the DLC injected power to the point where the DLC signal becomes many times larger than the nearest harmonics. The amount of injected power is measured in kilowatts so most ripple systems use motor-generator pairs to inject the signal; a very costly solution.

Higher frequency DLC systems, above 5 kHz, were also available for utilities that required higher data throughput or two-way communications. Westinghouse, General Electric, and Rockwell all offered such systems during the 1980s. As mentioned before, all these higher frequency systems required distribution network changes to accommodate the DLC signals and most used multiple carrier frequencies to overcome standing-wave phenomena.

Today, only a few companies produce DLC systems, as the cost has become prohibitive for the typical applications of automatic meter reading (AMR) and load shedding. The plummeting cost of radio communications, the need for more bandwidth, and the proliferation of estimated consumption billing, has caused many utilities to abandon DLC systems. The original advantages of DLC systems still exist, if only the cost can be dramatically reduced, and preferrably the data-rate brought up to a level that would enable other revenue generating/customer attention services such as real-time pricing, residential information (weather, news etc.) and remote service disconnection.

For the above reasons, power carrier systems have not proven popular. The present application overcomes these difficulties and combines this form of communication path with electrical equipment to be placed in the home. The powerline carrier system is used to broadcast signals into the homes. These broadcast signals can be saved temporarily for review by the occupants of the home and the broadcast signals can include instruction signals for controlling certain devices in the home. The present invention also combines this powerline carrier broadcast system with a different communication channel out of the home or premise for reporting to a central source or predetermined computer.

SUMMARY OF THE INVENTION

A data communication network for transmitting an outbound communication signal over an AC power transmission grid having a low frequency power carrier signal, according to the present invention comprises a signal input device located at an upstream point on the power grid, a signal, a signal receiving device located on the grid at a point downstream of the input device. The signal input device includes a signal input connection, a spread spectrum arrangement for coding the input signal, and an arrangement for injecting the spread spectrum coded input signal onto the low frequency power carrier signal of the power grid. The signal receiving device is connected to the power grid and receives the powerline signal receiving device, processes the coded powerline signal to substantially remove the effects of the power frequency signal, digitizing the remaining signal and despreading the remaining signal to reconstruct the input signal. The coded input signal is placed in a low frequency band to allow passage thereof through the power grid between said input and the receiving device and past any capacitor banks and transfer meter.

According to an aspect of the invention, the signal input device is located at a transmission or distribution substation of the power grid.

According to a further aspect of the invention, the signal receiving device is located at a distribution transformer.

According to a further aspect of the invention, the spread spectrum powerline carrier signal has a frequency band with an upper limit below about 2.5 kHz and preferrably, below 2.0 kHz.

A system for managing user-determined discretionary electrical loads in a household according to the present invention, comprises a plurality of discretionary electrical devices connected to a control arrangement for controlling or switching on and off electrical devices in accordance with user input and information from an outside source, a user interface for entering user information with respect to a scale indicating the level of power conservation aggression that is to be used with respect to management of the discretionary devices, a receiver for receiving electrical information from a source outside the household, and a microprocessor connected to the user interface, the receiver, the control arrangement and the discretionary electrical devices for varying the operation of said electrical devices in accordance with the user information and information received from said outside source.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
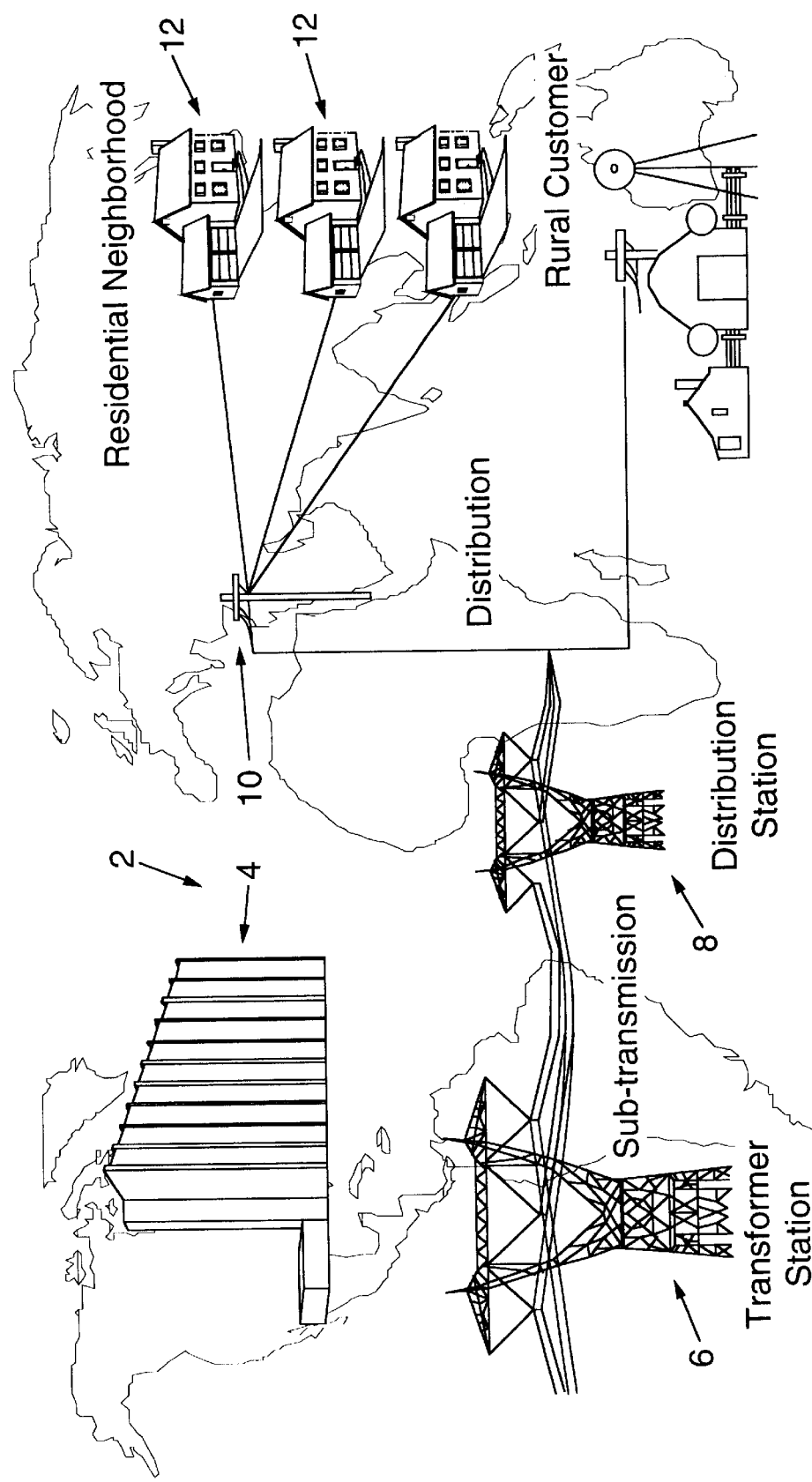
FIG. 1 is an overview of the system involving the power distribution grid and the eventual termination thereof in various households.

FIG. 1 shows a power distribution system 2 including a power generation source 4, which supplies power to a transformer station 6, and the distribution station 8. As can be appreciated, there will be many distribution stations and each distribution station 8 in turn, distributes power to a series of distribution transformers 10. These distribution transformers are sometimes referred to as feeder transformers. Typically, in North America, each distribution transformer 10 feeds anywhere from four to ten households. The segment between transformer station 6 and the distribution station 8 is normally referred to as a power transmission network and the signal between distribution station 8 and the distribution transformers is the distribution network.

Figure 2:
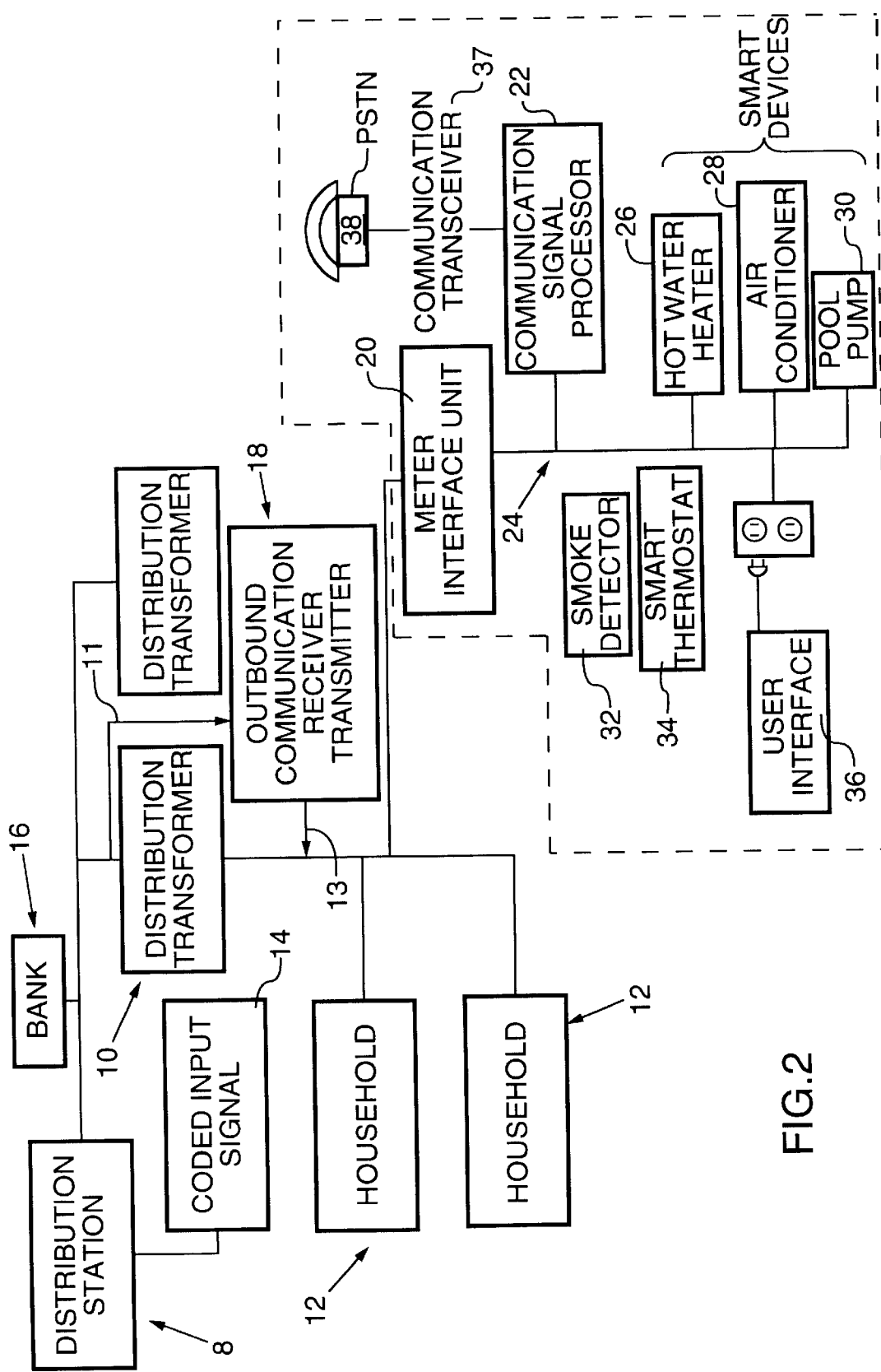
FIG. 2 is a schematic showing further details of the communication arrangement for transmitting of signals from a distribution station to the household.
Figure 3:
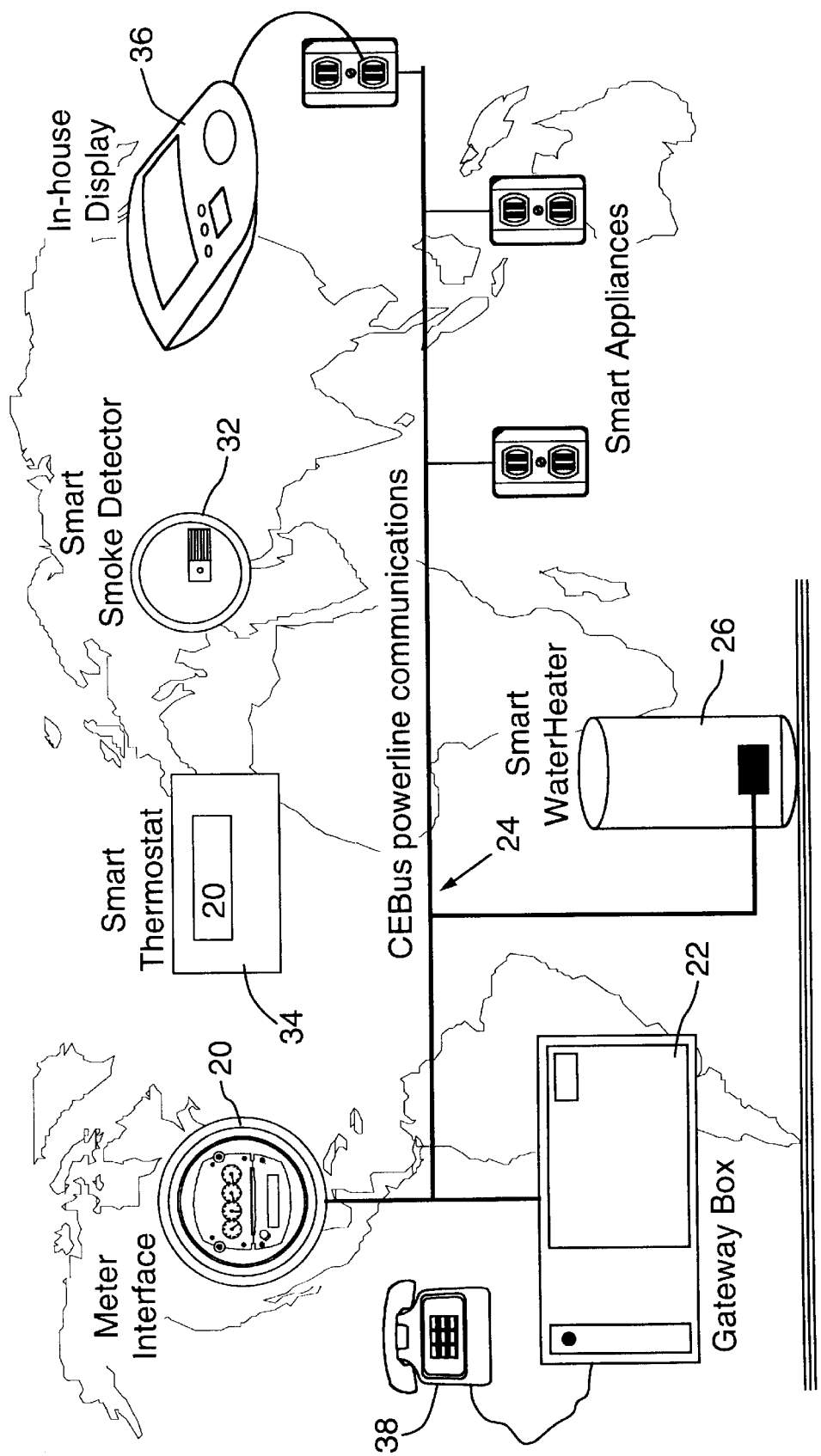
FIG. 3 is a depiction showing various devices of the system located in a household.

The schematic of FIG. 2 shows further details of the power distribution network between the distribution station 8 and individual households shown as 12. The power distribution network has been modified by including at the distribution station 8, a device 14 for injecting a coded communication signal on to the powerline signal. The injected signal is a broadcast signal, which is received and decoded on the low voltage side of the distribution transformer 10. The injected signal is a coded signal and is not affected by the corrective capacitor banks 16 which often are present between the originating station and the distribution transformers 10. The frequencies of the communication broadcast signal are relatively low and are unaffected by the corrective capacitor banks 16. This is in contrast to high frequency communication signals which could be introduced at the distribution station 8, however, with such high frequency signals, the corrective capacitor bank 16 would have to be trapped to allow the signal to pass therethrough. Unfortunately, this is a relatively expensive process and it also requires constant monitoring and quality control to ensure that all capacitor banks that are added, are properly trapped. By using a lower frequency signal, the signal passes through the capacitor banks, however, as will be further discussed, it has the disadvantage that the lower frequency signal is adversely affected by harmonics of the power signal.

Outbound communication receiver and transmitter 18 are located on the low voltage side of the distribution transformers 10. The precise location is not important as the households are interconnected by the transformer 10. It may be desirable to locate this receiver at the meter interface unit of a household for more convenient access while all households on the low voltage side of the transformer, continue to receive the retransmitted signal, as will be explained. The receiver, as generally shown by arrow 11, receives the incoming signal from the distribution transformer station. This signal is a combination of the power signal and the communication signal. The receiver/transmitter 18 processes the signal to strip out the communication signal and decode the signal. It then encodes the signal according to a different protocol and injects it on the secondary side of the distribution transformer 10 as indicated by line 13. This signal is preferably injected, using CEBus transmission protocols and will be received by any of the plurality of households located downstream of the distribution transformer 10 as a broadcast signal.

Each household 12 is connected to the distribution transformer 10 for receiving power and for receiving the CEBus translated communication signal. Each household has a meter interface unit 20 which is an electronic device associated with the meter of the house for electronic tracking of power consumption.

A communication signal processor 22 receives the now CEBus communication broadcast signal and processes the signal to extract and/or accumulate the information contained in the broadcast signal. It can be seen that the meter interface unit 20 and the various devices of the household are all interconnected by the household wiring, generally shown as 24. Hot water heater 26 is directly connected to the household wiring 24, as is Air Conditioner 28 and the Pool Pump 30. These have been labelled as smart devices in that they are CEBus devices which can be turned on or off. A load control box can be provided for controlling conventional air conditioners and other devices. The load control box is associated with the distribution panel and the communication signal processor 22. The load control box interrupts the power to these devices when instruction to do so by the signal processor 22.

Also associated with the system is a user interface unit 36 which communicates with the communication processor 22, and the meter interface unit, via the household wiring 24, as the user interface unit plugs into an electrical receptacle of the house wiring. In addition, the house may have a smoke detector 32, and a thermostat 34 which communicate with signal processor 22, either via the house wiring or their own dedicated wiring or by RF as is well known, particularly in the security field.

The communication signal processor 22 has associated therewith a communication transceiver 37 connected to a telephone 38 and thus to the publicly switched telephone network. In this way, the communication signal processor 22 can initiate an outbound communication to a remote computer from time to time or when instructed by the communication signal. This is of benefit in that instructions for meter reading, for example, can be transmitted over the powerline system and be received by the communication system processor 22 which then interacts with the meter interface 20 to determine power consumption and reports the results using the communication transceiver 37 and the publicly switched telephone network. Other electronic metering devices can be in communication with the signal processor 22 and these can also be reported on a regular basis or on a demand basis, if desired.

The broadcast signal includes general information of different types and the user can select and view any of this information, using the user interface unit 36. The user selects the particular information to be displayed from a listing of all the information and then the particular information is displayed on the user interface. The signal processor tracks these requests to provide market feedback information.

The schematic, as shown in FIG. 2, has additional benefits. The transmission of the CEBus communications within a household from smart devices to the communication transceiver or from the communication transceiver, to the smart devices, is also effectively transmitted to other households. This broadcast transmission between associated households is not a problem as each of the devices can have a unique address. This transmission has the added benefit that a communication signal can be sent to other households, for example, in the event of a security breach, or disconnection of the publicly switched telephone network. The transmitted signal is received by the communication signal processor of other households on the feed from the distribution transformer 10. These devices can then place an outbound communication and report to a security monitoring service, for example.

It is also possible that a communication device can be provided at the distribution transformer 10, as a backup for all households. In some cases, it may be desirable for the household to have its own transmissions limited to that particular household and appropriate blocking techniques can be used. It is also possible to selectively remove the block, if desired.

With the present system, it can be appreciated that the user interface 36 can provide information regarding the operation of his power system as well as other information. It has been found that it is possible to use spread spectrum coding techniques for injecting a communication signal on the powerline system, and achieve a reasonable data transmission rate and much higher than existing ripple control systems and without the high power requirements of ripple control systems. This higher transmission rate allows information, such as weather conditions, highway conditions, stock market results and other general information to be effectively transmitted over the powerline system as well as control signals for households. With this higher transmission rate, the DLC transmission system can additionally be used as an effective information communication channel for many different applications and the above list is provided for example only.

The user interface 36 also allows the user to input information to his communication signal processor 22 regarding the use of electrical power. The user interface 36 includes an eight line display capable of showing the user many screens of information. One of these screens allows inputting information to control the signal processor according to a user-set desired level of power conservation aggression that is to be carried out with respect to certain non-essential or predetermined electrical appliances.

For example, a water heater requires substantially more energy if a high certainty is required that one will never run out of hot water. On the other hand, if one, from time to time, can tolerate potentially running out of hot water, a substantial energy saving can be realized. If the probability of running out of hot water is increased further, further power savings can be realized. The user determines a power consumption aggression level for the discretionary loads. The communication signal processor 22, includes algorithms for the various discretionary loads to determine an operating procedure which takes local information and the command information into account, to satisfy the power supplier and the home owner. The algorithm for a particular device can take into account, the time of day and the time of year, for example. The strategy can also be varied for weekends.

It is anticipated that the power generation source may provide the user with a further rate discount if they are willing to allow for load shedding of these smart appliances. As can be appreciated, peak power demand is very costly and the ability to turn off or manage certain devices, and thus reduce power, is of great benefit to the power generation supply. With this arrangement, user control and the power supplier control is carried out using the powerline broadcast capability.

With the present arrangement, a broadcast signal can be sent over the powerlines from the distribution station, and predetermined devices can be efficiently manger to reduce peak demand. The user interface also allows the user to access various other devices, such as security systems which can be combined in the communication signal processor 22.

With the system as described, it is possible to have a narrow band broadcast delivered to each household. The broadcast signal is transmitted over a powerline, initially using a spread spectrum encoding technique which is then decoded and retransmitted according to CEBus for reception by the signal communication processors 22 of the various households. Processors 22 of the communication system provides outbound telephone signals and in particular, allows for the household telephone system to complete a communication with a predetermined computer located, for example, at the power utility office to report the various conditions within the house. The fact that the household initiates such a telephone communication signal is of benefit as the outbound communications system can monitor the line and use the line when it is not in use. As such, the telephone system provides a broadband communication path for fast transmission of data between the communication signal processor 22 and such predetermined computer.

Figure 4:
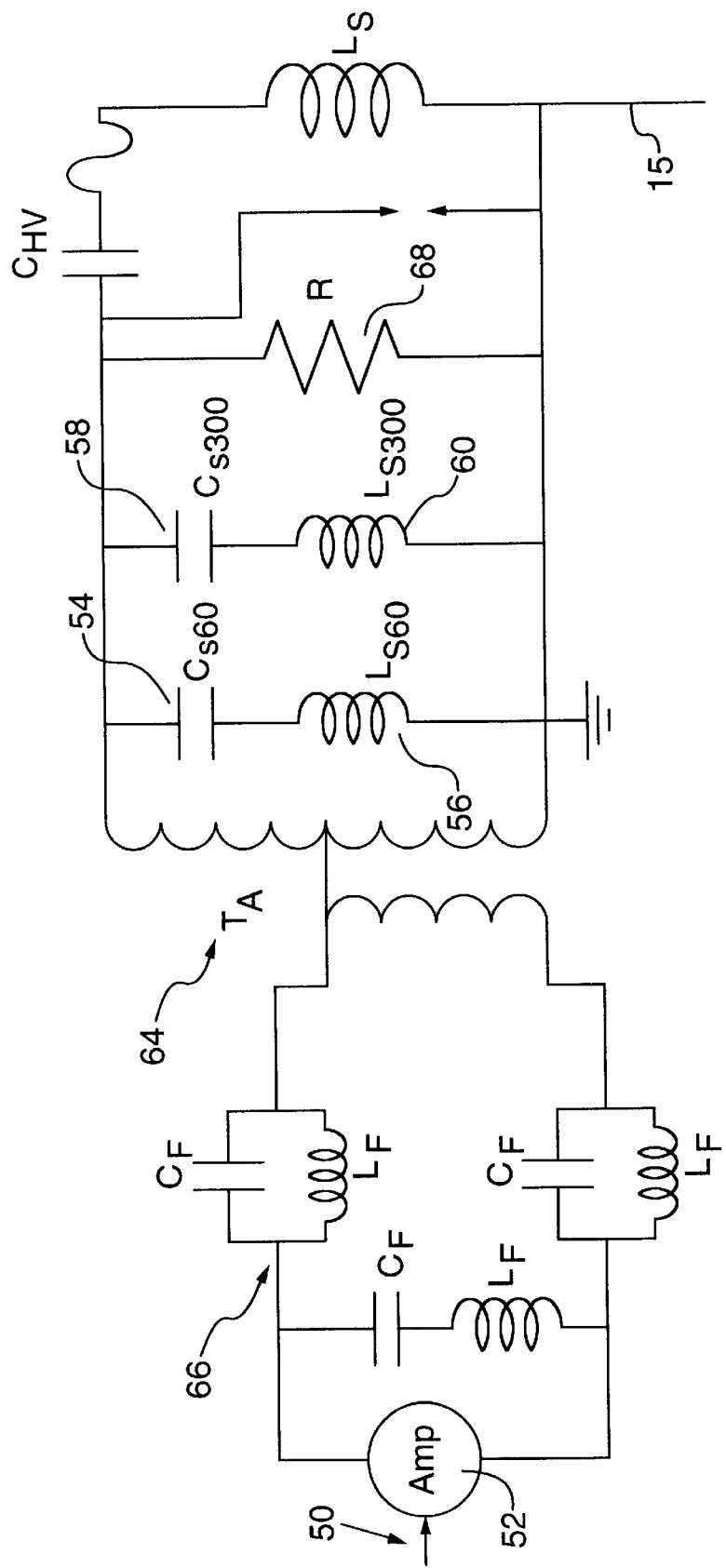
FIG. 4 is a circuit diagram of a signal injecting arrangement.

FIG. 4 shows details of the structure necessary for introducing the coded input signal, generally represented as 14 in FIG. 2.

A coded broadcast signal generally shown as 50 is provided in FIG. 4 to amplifier 52. The amplifier is separated from the power transmission line 15 by various components to effectively isolate the amplifier from the power transmission signal and its related harmonics. The circuit consists of six basic blocks: a power amplifier 52, a 60Hz blocking filter 66 and autotransformer 64, a 60 Hz tuned shunt defined by capacitor 64 and coil 56, a 300 Hz tuned shunt defined by capacitor 58 and coil 60, and a 50 ohms resistive shunt generally shown as resistor 68. The power amplifier 52 is capable of driving at least 20 volts and 5 amps into a 4 ohms inductive load.

The 60 Hz blocking filter 66 protects the amplifier from the 60 Hz power that comes through the high voltage capacitor. The autotransformer is used to optimize the coupling for different values of the high voltage coupling capacitor and station inductance. There is enough variation of the values of these parameters that flexibility is required. The non-coupled part of the transformer winding essentially acts as an inductor, that in series with the station transformer inductance, forms a high pass filter, with a high voltage capacitor. Lower values of station inductance or coupling capacitance require a larger section of the winding that is not coupled.

The 60 Hz tuned shunt carries the 60 Hz current from the high voltage coupling capacitor and keeps the voltage requirements for the auto transformer within the range of available standard products. The 300 Hz tuned shunt reduces the fifth harmonic voltage that is amplified by the resonance of the high voltage coupling capacitor and the inductor of the 60 Hz tuned shunt. The resistive shunt limits the voltage of harmonics other than 300 Hz that could damage the power amplifier. The coupling circuits were installed in three ventilated metal boxes; one circuit for each phase. 50 ohms resistive shunts for all three phases were installed in a separate ventilated box so that the main coupling circuit boxes could be removed for repairs or design modifications without de-energizing the high voltage capacitor. This resistor box was also fitted with three switches that can be used to short out the 50 ohm resistors, thus solidly grounding the capacitor bank. The protective spark gaps are installed in a plastic box on the pole supporting the high voltage capacitor bank. At this location, they protect all circuits from the 8000 volts that would result from accidental open circuiting of the capacitor ground conductors. Typical values for the various components are shown in the following tables:

TABLE A

| Component | Symbol | Value |
|---|---|---|
| Filter Capacitor | $C_F$ | 60 $\mu F$ |
| Filter Inductor | $L_F$ | 100 mH |
| Auto Transformer | $T_A$ | variable ratio |
| 60 Hz Shunt Capacitor | $C_{S60}$ | 120 $\mu F$ |
| 60 Hz Shunt Inductor | $L_{S60}$ | 60 mH |
| 300 Hz Shunt Capacitor | $C_{S300}$ | 8 $\mu F$ |
| 300 Hz Shunt Inductor | $C_{S300}$ | 30 mH |
| Resistive Shunt | R | 50 ohm |
| High Voltage Capacitor | $C_{HV}$ | 0.5–5.7 $\mu F$ |
| Station Transformer Inductance | $L_{ST}$ | 4–16 mH |

TABLE B

| Component | Description | Rating | |
|---|---|---|---|
| 60 $\mu F$ Capacitor | ASC Capacitors Type X386S | 440 | V |
| 60 mH Inductor (0.7 ohm) | Hammond 159ZC | 2 | A |
| Autotransformer | Superior Electric Powerstat 126U single phase | 1 140 15 | kVA V A |
| 30 mH Inductor (0.0175 ohms) | Hammond 195P20 | 20 2500 | A V |
| 8 $\mu F$ Capacitor | | 440 | V |
| 30 mH Inductor (0.16 ohms) | Hammond 195P10 | 10 2500 | A V |
| 100 ohm Resistor | ohmite L175J100 | 175 | W |
| Ventilated Box Handles (Pair) Terminal Strips | Hammond 1416T | | |
| Spark Gap (fail short) | TII Industries Inc. 325-2M station protector | 200 30 | V A |

It was found that this circuit is capable of protecting the amplifiers and allows the input signal 50 to be appropriately amplified and placed on the power carrier line.

The performance of the circuit in coupling the signal onto the high voltage conductors was measured by injecting a steady signal of 990 Hz. It was found that it was best to use three phase injection with all signals in phase.

From a review of FIG. 4, it can be appreciated that the amplifier 52 will receive signal 50 which is then amplified. This signal as will further be explained, is a spread spectrum coded version of the broadcast signal. In any event, FIG. 4 shows how the signal can be injected onto the power carrier transmission system.

Figure 5:
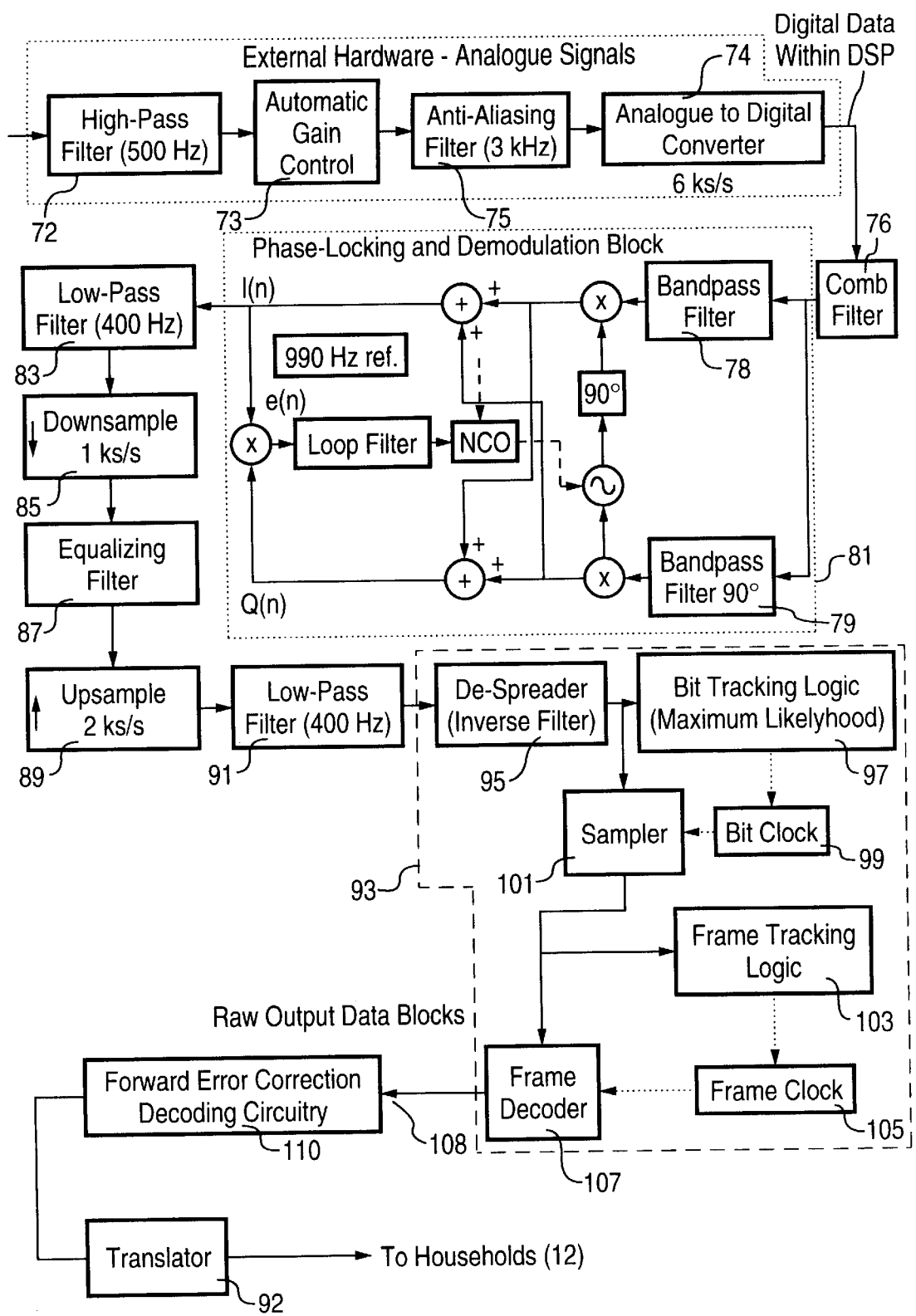
FIG. 5 is a schematic of the receiver processing arrangement.

FIG. 5 is a block diagram of the receiver provided on the low voltage side of the distribution transformer 10 for receiving the coded communication signal in combination with the power carrier signal and processing the signal to extract the coded communication signal and translate the same for retransmissions. The signal is first treated with a high pass filter 72 which is used to remove the first third and fifth harmonics of the power carrier signal and the signal below 500 Hz. The signal is then processed by the automatic gain control 73 and the anti aliasing filter 75. The signal is next converted from analogue to digital by the analogue to digital converter 74. The digital signal is then processed using comb filters 76. This filter is designed to remove further harmonics, however, in actual practice, it is far from ideal, as only signals at harmonic frequencies plus 30 Hz are unattenuated and all other frequencies follow a sine rolloff characteristic. The benefit of this type of filter is its simplicity of implementation. A comb filter has only two non zero taps and requires relatively few taps for its response. Basically, the comb filter removes the harmonics, however, it also removes portions of the signal which are valuable. This trade-off is tolerated due to the simplicity of implementation and the ability to process the signal quickly. The signal is then passed through band pass filters 78 and 79 which allow the signal between 500 Hz and 1500 Hz to pass. Band pass filters 78 and 79 are part of the phase locking demonstration block 81. This block adjusts for variations in phase and removes the 990 Hz reference frequency. The broadcast signal initially had a target date rate of about 60 bits/second and a seven digit pseudo random code is used to spread this signal. With this arrangement, the transmitted signal is less than 420 bits/second. Passing the frequency less than about 400 Hz will allow the target rate of 60 bits/second to be realized. Frequencies above this level are removed by the low pass filter 83.

The signal is then sampled by the down sample block 85 having a sample rate of 1 ks /second. Equalizing filter 8 adds some of the signal back in which the comb filter removed in removing the harmonics. Up sample block 89 then resamples the revised signal prior to being filtered by the low pass filter 91 (400Hz). The signal is then passed to the despreading arrangement 93.

The despreading arrangement includes inverse filter 95, bit tracking logic 97, bit clock 99, sampler 101, frame tracking logic 103, frame clock 105, and frame decoder 107. Raw output data blocks are outputted at 108 and are provided to a forward correction decoding circuit 110. The collected signal is then sent to the translator 92 for conversion into CEBus and subsequent transmission on the secondary side of the transformer to the households 12.

The use of spread spectrum effectively codes the communication or broadcast signal over a larger frequency band and much of the signal is located in the gaps between the harmonic frequencies of the power carrier. In this case, the spread signal is between 500 Hz and 1500 Hz and is spread about the carrier frequency of 990 Hz. The 990 Hz midpoint was selected to be between two power harmonics and it results in advantageous benefits.

Spread spectrum was initially developed for military applications and was in response to jamming signals. Basically by spreading the coded signal over a larger frequency band, it is difficult to jam, as it is continually shifting frequencies and jamming at particular frequencies only results in removal of a small portion of the signal. If there are sufficient jamming signals present, then the holes in the transmitted signal can be relatively high and higher error rates occur. In the present application, jamming signals can be equated to the harmonic signals that are present in a power transmission system. These harmonic signals are relatively strong and make the channel extremely noisy. Fortunately, the harmonics are all at known frequencies and therefore, it is possible to remove these frequencies from the signal leaving the signal between harmonics for transmission of a communication signal. In order to keep the sophistication of the microprocessor at the distribution transformer relatively inexpensive, the signal is processed using simplified comb filters. It is possible to use more accurate digital techniques for removing these frequencies, however, it requires more processing speed and higher costs. The spread spectrum coding uses the direct sequence spread spectrum approach with a seven digit pseudo-random code.

Spread spectrum systems have inherent jamming protection due to spectrum diversity but they can still be jammed if the jamming signal exceeds the jamming margin of the spread spectrum system. In the case of spread spectrum DLC power harmonics, they are so numerous within the transmission band and are of such magnitude that special steps have to be taken to remove them before passing the signal on to the receiver. In military and certain commercial systems, spread spectrum signals are first preprocessed by an adaptive filter to remove unwanted or jamming signals. The spread spectrum DLC arrangement can be simplified as the jam signals in the transmission band of known frequency and phase, and this allows for design of static, harmonic rejection filters, and lowers hardware requirements.

The design of a digital filter that will remove the harmonics but will leave the desired signal intact is dependent upon certain hardware constraints. The DLC receiver is implemented on a 16 bit, 40 MHz DSP having a 6 kHz sampling rate and 256 bytes of RAM.

In order to have the required characteristic of linear phase across the band, an FIR filter is employed. For a FIR filter running at 6 kHz to achieve the multiple pass bands, between harmonics, that is from 500 Hz to 1500 Hz would require at least 500 taps. This would exceed the RAM resources of the DSP processor which must store both filter history values and tap co-efficients in RAM, in order to use the fast multiplying and add instructions of the DSP processor.

A simpler approach is to use a comb filter as previously described. A comb filter has only two non zero filter coefficients, greatly simplifying the processing requirement and reducing the amount of memory needed for the DSP processor. Typically, the comb filter needs approximately 100 history values but this is many times less than would be required by a more tailored FIR filter at this sampling rate. The phase response of this filter has the desirable property of linear phase. However, there are 180° phase shifts at the locations of the zeros, so this filter is only linear between harmonics. Such phase distortion would be unacceptable for a wide band signal. By selecting the modulating frequency of 990 Hz, exactly between two harmonics, then all side bands that lie between this frequency and the harmonics fall into the band of linear phase. The side bands that are further than 30 Hz from the carrier, experience a phase shift of 180° with respect to the carrier. The side bands, while phase shifted, with respect to carrier are 360° or 0° out of phase with respect to each other's respective side band. With no phase distortion of the double sided band signal, no cancellation will occur when the modulated signal is later digitally demodulated.

A major implementation issue exists when using a comb filter to remove powerline harmonics. The comb filter's rejection band for power harmonics is so small, less than 10 mHz, that the only way such a filter can work, is if the power frequency does not deviate for more than 16 $\mu$Hz. Such a requirement is not met in power transmission systems which typically vary at least as much as 20 mHz over a day. Therefore, the only way a comb filter can work, is if it is phase locked to the powerline. The spread spectrum DLC's 6 kHz nominal sampling rate, is convenient. A phase lock loop to the powerline is used and a frequency divider in the order of 100's is placed in the feedback path, allowing the sample clock rate to be derived. This ensures that as the power system frequency deviates from 60 Hz, the harmonics will also be rejected by the front end of the DLC receiver. Therefore, this arrangement provides phase lock.

As can be appreciated from the above, it is possible to use spread spectrum coding techniques on a powerline carrier by appropriate selection of the frequency of the communication signal for effective transmission between the harmonics of the power carrier signal. It can also be appreciated from the above, that the processor used for despreading and effectively removing of the effects of the power carrier signal, can also be relatively simple while still achieving a satisfactory data rate, useful for a broadcast type signal. By positioning the processing arrangement at the distribution transformer, the cost for the microprocessor used to process the signal at the transformer, is effectively divided by the number of households located downstream. It is possible to provide signal processing arrangements in each household to despread the signal, however, the cost for the system increases. The cost for the equipment to receive a CEBus transmission is relatively inexpensive, and thus, the cost of the microprocessors within the home, is kept relatively low.

It is possible to have enhancements to the system by increasing the capabilities of the processor provided in the de-spreading arrangement. This may be desirable where high data rates are desired. Higher data rates are often not necessary for broadcast signals as there is ample time to receive the signals.

With the present arrangement, a broadcast signal is sent over the distribution line carrier arrangement in a spread spectrum coded format. It is received at a downstream location within the distribution system and despread and subsequently sent to households downstream in a different form, namely; translated into CEBus. Thus, the communication signal from the distribution station is transmitted in a first form received on the low voltage side of the distribution transformer and converted to a second form, and retransmitted to households located on the low voltage side of the transformer. The equipment in the household receives and processes the signal in accordance with instructions which may be generally provided therein and as may be provided by the household. A processor within the house receives the general broadcast signal and receives user determined characteristics and then takes appropriate action by sending addressed CEBus signals to control various electrical loads, or provides direct control of the devices through a load control box associated with the processor. This processing capability within the house accommodates variations determined by the user and adds a whole series of options not available with conventional on/off controls.

The broadcast signal can include, as required, load shed command signals. These command signals can include the load shed command, the duration of the load shed, and the outside temperature. This information is used by the processor, together with the user input and parameters to control the discretionary devices. The processor using algorithms, which take into account, the time of day and year, user parameters, and the broadcast load command information, then determines how the devices will be controlled. This does not necessarily mean the devices will be off for the entire duration, but will be managed, based on the combined needs and standards of the household and the utility provider. The broadcast signal is used to provide command signals when required and to provide other information at other times.

As the number of homes effectively controlled by a distribution station is not that large, it is possible to send addressed signals for action of specific equipment within a single household. This is valuable if you desire to turn off the power to a certain user in the event of non payment or for other reasons, or where a specific report is desired. Individual addressed signals can be provided in the broadcast signal, as the broadcast signal can be continuous, and timing is not urgent.

For such desired events as reporting of meter readings, a broadcast signal can be sent with the equipment within an individual household recognizing the signal as a request to report meter readings or other functions, and these results can be reported to a predetermined computer over the telephone lines as earlier described. Thus, the meter reading can be caused by a broadcast initiation signal, followed by a telephone reporting function. In this way, the narrow band transmission channel of the powerline carrier, is effectively used and the high speed data communication capability of a telephone line is effectively used for the more complicated reporting of information. As can be appreciated, the signal to provide instructions to report meter readings can be of a generic nature, such that it is used by a host of households, and is relatively short and suitable for the narrow band transmission channel.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A system for demand side management of electrical household appliances connected to an AC power grid, said system comprising
   a signal input device associated with said power grid for injecting a coded low band broadcast signal onto said power carrier signal, said coded broadcast signal being coded using a spread spectrum technique and a low frequency band,
   a signal receiving device located on said grid on a low voltage side of a distribution transformer connected to individual services, said signal receiving device receiving said spread spectrum low band broadcast signal and decoding said coded signal to produce a household broadcast signal,
   said signal receiving device cooperating with a signal converting and transmitting device for converting said household broadcast signal to a broadcast signal using a different protocol injected on the lines to any individual services associated with said transformer,
   a host of household receiving devices each of which is associated with one household and receives and processes said household broadcast signal,
   each household receiving device communicating with a user interface device for
   a) querying said household receiving device and displaying information provided in said household broadcast signal, and
   b) adjusting user set control parameters for selected electrical appliances which are remotely controlled by said household receiving device according to said user set parameters and parameters of a power provider.

2. A system as claimed in claim 1 wherein said user interface device also displays energy consumption information.

3. A system as claimed in claim 1 wherein said different protocol is CEBus or X10.

4. A system as claimed in claim 1 wherein said user interface device is connected to an electrical receptacle for powering of said interface and communicates with said household receiving device over the powerlines associated with said electrical receptacle.

5. A system as claimed in claim 1 wherein said selected electrical appliances include any of electrical hot water heaters, electric baseboard heaters, and air conditioners, pool pumps and pool heaters.

6. A system as claimed in claim 1 wherein each household receiving device monitors said household broadcast signal for general instructions regarding operation of said selected electrical appliances and upon recognition of a general instruction that meets said control parameters adds an address thereto which is the local address of the appliance, said selected appliances upon recognition of said address acts in accordance with said signal.

7. A system as claimed in claim 1 wherein said user set parameters for selected electrical appliances include a scale input for selecting the level of aggression that is to be used with respect to management of said selected electrical appliances.

* * * * *